(12) United States Patent
Guinart et al.

(10) Patent No.: US 10,661,616 B2
(45) Date of Patent: May 26, 2020

(54) METHOD FOR DETERMINING THE RADIAL ACCELERATION OF A VEHICLE WHEEL

(71) Applicants: Continental Automotive France, Toulouse (FR); Continental Automotive GmbH, Hannover (DE)

(72) Inventors: Nicolas Guinart, Toulouse (FR); Jean-Phillippe Boisset, Montauban (FR)

(73) Assignees: CONTINENTAL AUTOMATIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 271 days.

(21) Appl. No.: 15/767,231

(22) PCT Filed: Oct. 12, 2016

(86) PCT No.: PCT/EP2016/001695
§ 371 (c)(1),
(2) Date: Apr. 10, 2018

(87) PCT Pub. No.: WO2017/063740
PCT Pub. Date: Apr. 20, 2017

(65) Prior Publication Data
US 2019/0070910 A1 Mar. 7, 2019

(30) Foreign Application Priority Data
Oct. 13, 2015 (FR) ...................... 15 59733

(51) Int. Cl.
*G01P 3/48* (2006.01)
*G01P 15/08* (2006.01)
(Continued)

(52) U.S. Cl.
CPC ...... *B60C 23/0488* (2013.01); *B60C 23/0489* (2013.01); *B60C 23/064* (2013.01);
(Continued)

(58) Field of Classification Search
None
See application file for complete search history.

(56) References Cited

U.S. PATENT DOCUMENTS 8,843,267 B2 * 9/2014 Park .................... B60C 23/0416
701/34.4
9,459,275 B2 10/2016 Guinart
(Continued)

FOREIGN PATENT DOCUMENTS

CN 103153656 B 12/2015
DE 102010041768 A1 4/2012
(Continued)

OTHER PUBLICATIONS

International Search Report and Written Opinion for International Application No. PCT/EP2016/001695, dated Nov. 30, 2016, 11 pages.
(Continued)

*Primary Examiner* — Natalie Huls
*Assistant Examiner* — Jermaine L Jenkins
(74) *Attorney, Agent, or Firm* — RatnerPrestia

(57) ABSTRACT

A method for determining a vehicle wheel's radial acceleration for a tyre pressure monitoring system, having a central electronic unit. The wheels each including a wheel unit attached to a rim or to a valve or the tyre tread's inner face, and including at least one radial acceleration sensor at a distance from the wheel's rotational axis, to measure the wheel's radial acceleration when it is not saturated, and a microprocessor, including: when the radial acceleration sensor is not saturated, measuring the radial acceleration of the
(Continued)

wheel using the radial acceleration sensor; determining the wheel's rotation period; deducing, from the radial acceleration and the period, the distance of the wheel unit; storing the distance in the wheel unit's memory; and when the radial acceleration sensor is saturated, determining the wheel's rotation period, and calculating the radial acceleration from the rotation period and the stored distance.

17 Claims, 3 Drawing Sheets

(51) Int. Cl.
      *G01P 21/00*     (2006.01)
      *B60C 23/04*     (2006.01)
      *B60C 23/06*     (2006.01)

(52) U.S. Cl.
      CPC ................ *G01P 3/48* (2013.01); *G01P 15/08* (2013.01); *G01P 15/0888* (2013.01); *G01P 21/00* (2013.01)

(56) References Cited

U.S. PATENT DOCUMENTS

| | | |
|---|---|---|
| 9,669,664 B2 | 6/2017 | Kretschmann |
| 10,150,470 B2 * | 12/2018 | Wang .................. B60W 30/045 |
| 10,239,367 B2 * | 3/2019 | Fink ...................... B60C 23/065 |
| 10,259,277 B2 * | 4/2019 | Billy .................... B60C 23/0493 |
| 2009/0293602 A1 | 12/2009 | Gotschlich |
| 2011/0082663 A1 * | 4/2011 | Geisler ............... B60C 23/0416 |
| | | 702/141 |
| 2013/0179113 A1 | 7/2013 | Guinart |
| 2014/0107946 A1 | 4/2014 | Kandler et al. |
| 2014/0195107 A1 | 7/2014 | Park et al. |
| 2015/0239298 A1 | 8/2015 | Kretschmann |
| 2019/0241031 A1 * | 8/2019 | Billy ....................... B60B 37/10 |

FOREIGN PATENT DOCUMENTS

| | | |
|---|---|---|
| DE | 102012217901 B3 | 5/2014 |
| WO | 2012045917 A1 | 4/2012 |
| WO | 2014053322 A1 | 4/2014 |

OTHER PUBLICATIONS

Chinese Office Action for Chinese Application No. 201680072776.1, dated Nov. 5, 2019, with translation, 13 pages.

* cited by examiner

METHOD FOR DETERMINING THE RADIAL ACCELERATION OF A VEHICLE WHEEL

CROSS REFERENCE TO RELATED APPLICATIONS

This application is the U.S. National Phase Application of PCT International Application No. PCT/EP2016/001695, filed Oct. 12, 2016, which claims priority to French Patent Application No. 1559733, filed Oct. 13, 2015, the contents of such applications being incorporated by reference herein.

FIELD OF THE INVENTION

The present invention relates to a method for determining the radial acceleration of the wheel of a vehicle.

BACKGROUND OF THE INVENTION

For safety purposes, an increasing number of motor vehicles possess detection systems including electronic boxes mounted on each of the wheels of the vehicle, enclosing sensors dedicated to measuring parameters such as the radial acceleration of the wheel, and the pressure and the temperature of the tire fitted to this wheel.

These monitoring systems are conventionally equipped with electronic boxes (also called 'wheel units') mounted on each of the wheels of the vehicle and incorporating, in addition to the aforementioned sensors, a microprocessor, a memory and a radiofrequency transmitter, on the one hand, and with a central unit (mounted on the vehicle) for receiving the signals transmitted by the radiofrequency transmitters of each wheel, including an electronic control unit (or ECU) incorporating a radiofrequency receiver connected to an antenna, on the other hand.

Besides measuring the usual parameters that are intended to supply the driver with direct information regarding operating parameters of the wheels, it has also proved of interest to supply additional information, including characteristic data of the footprint of the tires, which enable the central unit in particular to estimate the load applied to each of the wheels of the vehicle or else to determine the location of the wheel units on the wheels of the vehicle. All of these functions require knowledge of the value of the radial acceleration of the wheels of a vehicle.

To measure radial acceleration, it is known to use radial acceleration sensors of microelectromechanical system type (also called 'MEMS'), in particular piezoelectric accelerometers that are well known per se.

However, beyond a certain speed of the vehicle, such radial acceleration sensors are subject to saturation, making them impossible to use. Generally, such saturation sets in at a maximum radial acceleration of 350 G, corresponding to a varying speed of the vehicle, depending on the arrangement of the acceleration sensor in the wheel and also depending on the diameter of the latter. Thus, such saturation of the acceleration sensor may set in at speeds varying between 110 km/h and 200 km/h. In the present disclosure, the saturation speed under consideration of 130 km/h is therefore purely illustrative and in no way limiting. Thus, in the proximity of or beyond this threshold, radial acceleration measurements are unavailable, making the abovementioned monitoring, location or load-monitoring functions impossible, or even making it impossible to monitor the wear of the tires. Specifically, at high speeds, with the accelerometer being saturated, the tire footprint detection signal, which is essential for implementing these functions, is disabled.

This problem of saturation of the radial acceleration sensors is known and, to rectify it, it has been proposed to replace the radial acceleration sensor with a tangential acceleration sensor (see for example document US 2014/0195107 which is incorporated by reference), but this tangential acceleration sensor does not allow the system for monitoring the pressure of the tires to perform the abovementioned functions, these requiring radial acceleration measurements.

SUMMARY OF THE INVENTION

One aim of an aspect of the present invention is to propose a method that makes it possible to determine the radial acceleration of a wheel of a motor vehicle when the latter reaches a threshold speed, starting from which this radial acceleration is not able to be measured by the dedicated sensor.

According to an aspect of the invention, this aim is achieved by virtue of a method for determining the radial acceleration of a wheel of a motor vehicle in conditions in which a radial acceleration sensor is saturated, said vehicle being fitted with a system for monitoring the pressure of the tires of the wheels of the vehicle, and being equipped with an electronic central unit, said wheels each including a wheel unit attached to a rim or to a valve or to the inner face of the tread of the tire of the wheel at a distance R from the axis of rotation of said wheel, and including at least one radial acceleration sensor configured to measure the radial acceleration Zmes of the wheel when it is not saturated, and a microprocessor, this method being noteworthy in that it includes:

1) a first step, when the radial acceleration sensor is not saturated, consisting in:
   a) measuring the radial acceleration Z of the wheel using the radial acceleration sensor;
   b) determining the period of rotation T of the wheel;
   c) deducing, from this radial acceleration Z and from this period T, the distance R between the axis of rotation of the wheel and the wheel unit using the formula:

$$R = \frac{z}{\omega^2}$$

where:

$$\omega = \frac{2\Pi}{T}$$

d) storing this distance R in the memory of the wheel unit;
2) a second step, when the radial acceleration sensor is saturated, consisting in:
   a) determining the period of rotation T of the wheel;
   b) calculating said radial acceleration Zcalc using the following formula:

$$Zcalc = R \times \omega^2$$

where:

$$\omega = \frac{2\Pi}{T}$$

R being the distance between the axis of rotation of the wheel and the wheel unit defined and stored in step 1) of the method according to the invention and T being the period of rotation determined in step 2a).

e) The method according to an aspect of the invention affords several beneficial advantages. In particular, this method makes it possible to have a value of the radial acceleration of the wheels of a vehicle, regardless of the speed of the latter or the saturation level of the radial acceleration sensor.

According to one exemplary embodiment in which the wheel unit is attached to the valve or the rim of the wheel of the vehicle, the period of rotation of the wheel is determined in steps 1b) and 2a) from a sinusoidal gravity signal.

According to one advantageous embodiment, the period of rotation of the wheel corresponds to the time separating two consecutive maxima or two consecutive minima of the sinusoidal gravity signal.

According to another exemplary embodiment in which the wheel unit is attached to the inner face of the tread of the tire of the wheel of the vehicle, the period of rotation of the wheel is determined in steps 1b) and 2a) from a footprint detection signal.

According to one advantageous embodiment, the period of rotation of the wheel corresponds to the time separating two footprint detections.

According to one advantageous exemplary execution, step 1) of determining the distance between the axis of rotation of the wheel and the wheel unit is triggered when the vehicle is set in motion.

According to one preferred exemplary embodiment, step 1) of determining the distance between the axis of rotation of the wheel and the wheel unit is repeated after each stoppage of the vehicle.

Thus, if the wheel of the vehicle has been changed during this stoppage, the distance between the axis of rotation of the wheel and the wheel unit fitted to said wheel is updated.

According to one advantageous exemplary embodiment, step 1) of determining the distance between the axis of rotation of the wheel and the wheel unit is repeated after each stoppage of the vehicle of a duration at least equal to 5 minutes.

Thus, assuming that 5 minutes are required to change a wheel (the average duration is generally 15 minutes), this makes it possible to trigger the method according to the invention only when the vehicle downtime is long enough to be able to change a wheel, thus making it possible to conserve the batteries of the wheel units.

BRIEF DESCRIPTION OF THE DRAWINGS

Other aims, features and advantages of the present invention will become apparent from the following description, provided by way of non-limiting example with reference to the appended drawings, in which.

DETAILED DESCRIPTION OF THE PREFERRED EMBODIMENTS

Figure 1:
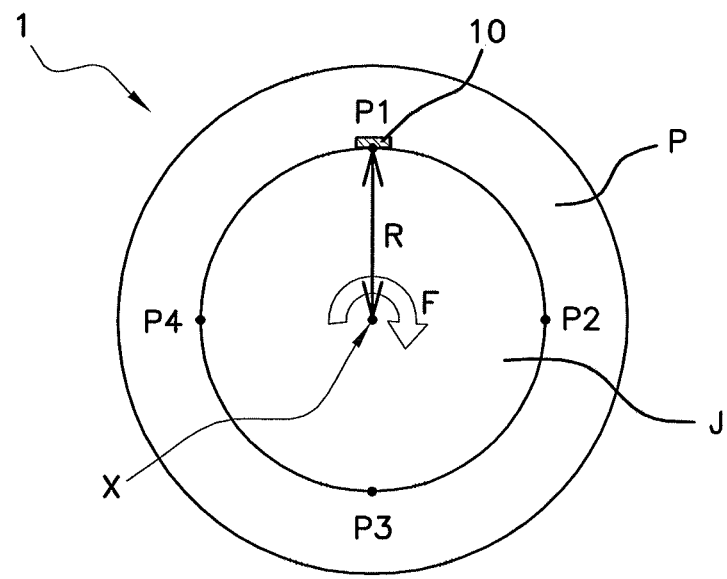
FIG. 1 is a schematic view illustrating a wheel equipped with a wheel unit arranged on the rim of said wheel.

It is known that the value of the radial acceleration Z measured by the radial acceleration sensor is given by the equation:

$$Z(t) = g \times \sin(\omega(t) \times t) + R \times (\omega(t))^2 \quad (1)$$

where g is the acceleration due to gravity.

Since the expression $g \times \sin(\omega(t) \times t)$ of formula (1) varies between +g and −g, that is to say between +9.81 and −9.81 m/s², as $\sin(\omega(t) \times t)$ varies between −1 and +1, the invention therefore proposes for the value of this expression to be ignored given the value of the expression $R \times (\omega(t))^2$ corresponding to the centrifugal force which, for its part, is proportional to the square of the linear speed of the vehicle. It is therefore possible to simplify equation (1), giving:

$$Z(t) = R \times (\omega(t))^2 \quad (2)$$

Vehicles fitted with a system for monitoring the pressure of the tires comprise an electronic central unit (not shown) arranged inside the vehicle, and, on each of the wheels of said vehicle, a wheel unit 10 attached to a rim 3 or to a valve or to the inner face of the tread of the tire P of the wheel 1, at a distance R from the axis X of rotation of the wheel 1, this wheel unit 10 includes at least one radial acceleration sensor such as for example a radial accelerometer, measuring the radial acceleration Zmes of the wheel 1, and a microprocessor (not shown) responsible for calculating and monitoring the data arising from the sensors fitted to the wheel unit 10.

In the present disclosure, the distance R between the axis X of rotation of the wheel and the wheel unit 10 also represents the distance between the axis X of rotation of the wheel and the radial acceleration sensor contained in said wheel unit 10.

According to an aspect of the invention, the method for determining the radial acceleration Zcalc includes two main steps, the first step taking place when the radial acceleration sensor is not saturated, in other words when the radial acceleration measurements using the radial acceleration sensor are possible, and a second step when the radial acceleration sensor is saturated, in other words when the radial acceleration measurements using the radial acceleration sensor are erroneous or impossible.

In the present disclosure, the expression 'at high and medium speeds' corresponds to a speed of the vehicle for which the radial acceleration sensor of the monitoring system is saturated; in one entirely nonlimiting example, it corresponds to speeds greater than or equal to 130 km/h. As a result, the expression 'at low speeds' corresponds to a speed of the vehicle at which the radial acceleration sensor is not saturated, that is to say a speed less than 130 km/h.

According to an aspect of the invention, the method for determining the radial acceleration Zcalc of the wheel 1 of a vehicle thus includes a first step 1) of determining the distance R between the axis X of rotation of the wheel and the wheel unit 10, when the radial acceleration sensor is not saturated.

According to an aspect of the invention, this step 1) consists in:
a) measuring the radial acceleration Zmes of the wheel 1 using the non-saturated radial acceleration sensor;
d) determining the period of rotation T of the wheel 1, namely the time necessary to perform one wheel 1 rotation, as described hereinafter;
c) deducing, from this radial acceleration Zmes measured in step 1a) and from this period T determined in step 1b), the distance R between the axis X of rotation of the wheel 1 and the wheel unit 10 using the formula:

$$R = \frac{Zmes}{\omega^2}$$

where:

$$\omega = \frac{2\Pi}{T}$$

d) storing this distance R in the memory of the wheel unit 10.

Figure 2:
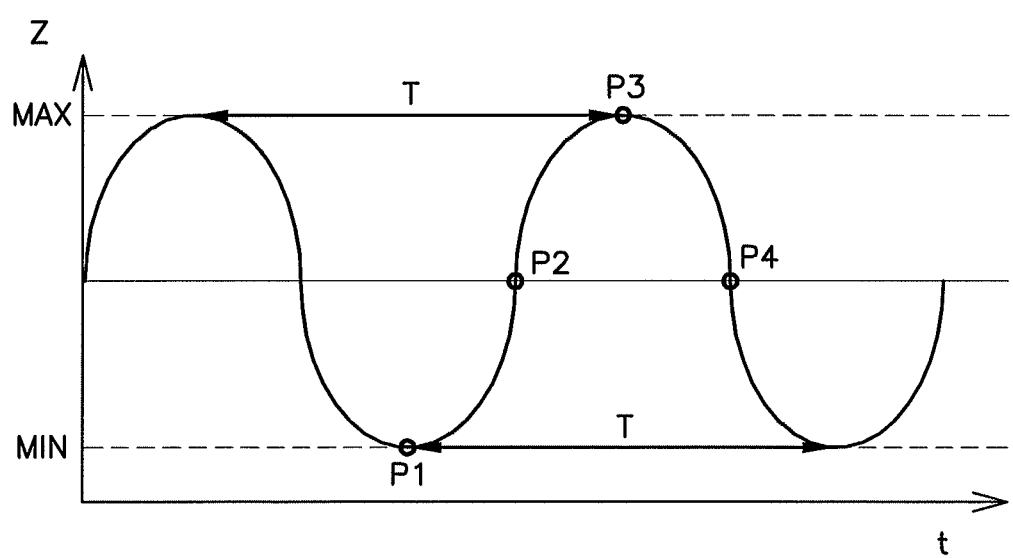
FIG. 2 is a view illustrating the sinusoidal gravity signal measured by a wheel unit fitted to the wheel of a vehicle, when said wheel is rotating.

When the wheel unit 10 is attached to the rim 3 of the wheel 1 of a vehicle, as illustrated in FIG. 1, the period of rotation T of said wheel 1 is determined in step 1b) from a sinusoidal gravity signal (FIG. 2). This signal is obtained, in a manner known per se, by fast sampling of the acceleration.

The radial acceleration sensor of the wheel unit 10 measures the radial acceleration Zmes several times over one wheel 1 rotation. Thus, as illustrated in FIG. 1, the radial acceleration sensor of the wheel unit 10 situated on the rim 3 of the wheel 1 measures the radial acceleration Zmes at various positions over one rotation of the wheel 1, when said wheel 1 is rotating in the direction of rotation illustrated by the arrow F.

As illustrated in FIG. 2, the curve of the radial acceleration Zmes is therefore a sinusoid whose maximum MAX and minimum MIN correspond, respectively, to the position of the radial acceleration sensor, and therefore of the wheel unit 10, at the bottom of the wheel 1 in position P3 and to the position of the radial acceleration sensor, and therefore of the wheel unit 10, at the top of the wheel 1 in position P1.

Advantageously, the period of rotation T of the wheel 1 corresponds to the time separating two consecutive maxima MAX or two consecutive minima MIN of the sinusoidal gravity signal, using a known sampling method. Such a sampling method is described in document WO 2012/045917 which is incorporated by reference filed by the Applicant.

The above description applies identically when the wheel unit 10 is attached to the valve (not shown) of the wheel 1.

Figure 4:
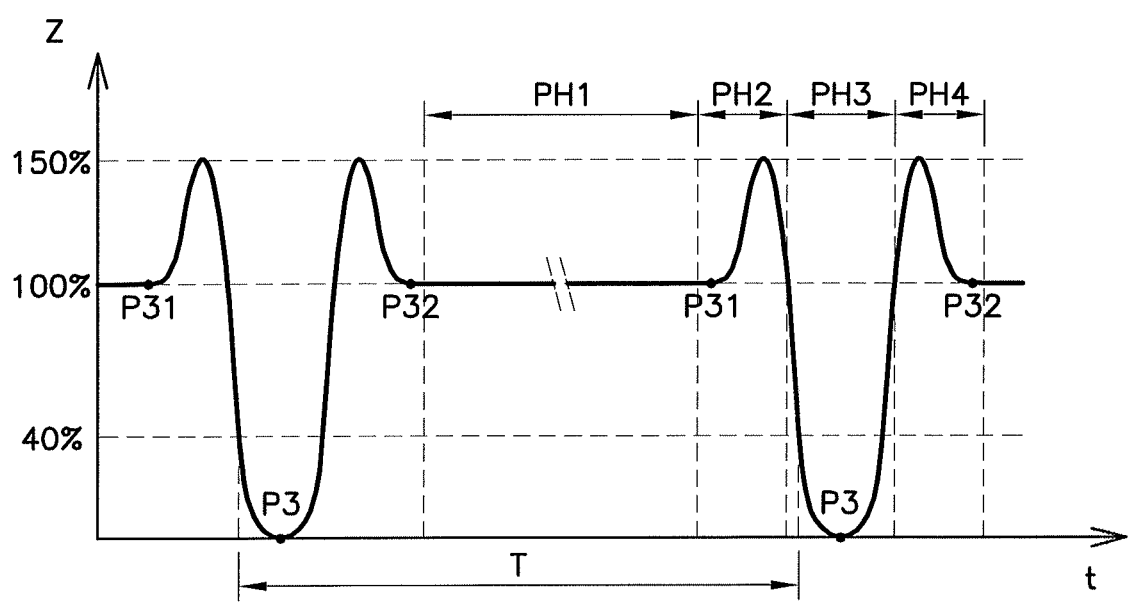
FIG. 4 is a view illustrating the tire footprint detection signal for a vehicle wheel equipped with a wheel unit positioned on the inner face of the tread of the tire, for a situation in which the radial acceleration sensor is not saturated.

When the wheel unit 10 is attached to the inner face of the tread of the tire P of the wheel 1 of the vehicle, the period of rotation T of the wheel 1 is determined in step 1b) from the footprint detection signal (FIG. 4).

The radial acceleration sensor of the wheel unit 10 measures the radial acceleration Zmes several times over one wheel 1 rotation. Thus, the radial acceleration sensor of the wheel unit 10 situated on the inner face of the tread of the tire P of the wheel 1 of the vehicle measures the radial acceleration Zmes at various positions over one rotation of the wheel 1, when said wheel 1 is rotating in the direction of rotation illustrated by the arrow F (FIG. 3).

Figure 3:
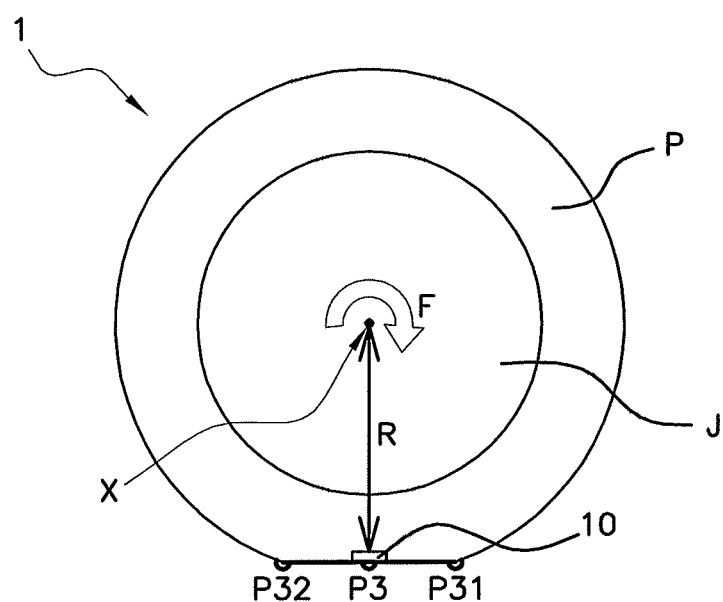
FIG. 3 is a schematic view illustrating a wheel equipped with a wheel unit arranged on the inner face of the tread of the tire of said wheel.

FIG. 4 illustrates the deformation of the tire P when it enters into contact with the ground, also called tire P footprint detection signal. This signal consists of four phases PH1, PH2, PH3 and PH4:

Phase PH1 corresponds to the phase during which the radial acceleration sensor of the wheel unit 10 occupies the positions between positions P32 and P31, when said wheel 1 is rotating in the direction of rotation illustrated by the arrow F in FIG. 3, that is to say when the tire P is not in contact with the ground. During this phase PH1, the radial acceleration Zmes has a value substantially equal to 100% of the nominal radial acceleration; in other words, this nominal radial acceleration is the radial acceleration measured outside of the footprint;

Phase PH2 corresponds substantially to the phase during which the radial acceleration sensor of the wheel unit 10 occupies position P31, corresponding to the position of the radial acceleration sensor upon entry of the footprint (that is to say upon entry of the tire P into contact with the ground). During this phase PH2, the signal records a maximum peak of a value substantially equal to 150% of the nominal radial acceleration;

Phase PH3 corresponds substantially to the phase during which the radial acceleration sensor of the wheel unit 10 occupies position P3 at the bottom of the wheel 1. The signal decreases until it reaches a zero radial acceleration value;

Phase PH4 corresponds substantially to the phase during which the radial acceleration sensor of the wheel unit 10 occupies position P32, corresponding to the position of the radial acceleration sensor upon exit of the footprint (that is to say when the tire comes out of contact with the ground). During this phase PH4, the signal again records a maximum peak of a value substantially equal to 150% of the nominal radial acceleration.

Thus, detection of the footprint corresponds to the signal containing all of the phases PH1, PH2, PH3 and PH4.

In this case, the period of rotation T of the wheel 1 corresponds for example to the time separating two footprint detections.

Advantageously, the period of rotation T of the wheel 1 corresponds to the time separating two consecutive values of a percentage of the nominal radial acceleration, for example a percentage below 50% of the nominal radial acceleration, directly after the footprint entry, in other words, during phase PH3.

Preferably and advantageously, step 1) of determining the distance R between the axis X of rotation of the wheel and the wheel unit 10 is triggered when the vehicle is set in motion.

Preferably and advantageously, step 1) of determining the distance R between the axis X of rotation of the wheel and the wheel unit 10 is repeated after each stoppage of the vehicle.

Thus, if the wheel 1 of the vehicle has been changed during this downtime, the distance R between the axis X of rotation of the wheel 1 and the wheel unit 10 fitted to said wheel 1 is updated. For example, step 1) of determining the distance R between the axis X of rotation of the wheel and the wheel unit 10 is repeated after each stoppage of the vehicle of a duration at least equal to 15 minutes. Preferably, step 1) of determining the distance R between the axis X of rotation of the wheel and the wheel unit 10 is repeated after each stoppage of the vehicle of a duration at least equal to 5 minutes.

When this distance R between the axis X of rotation of the wheel 1 and the wheel unit 10 is determined and stored, this distance R is used in the second step 2) of the method.

Figure 5:
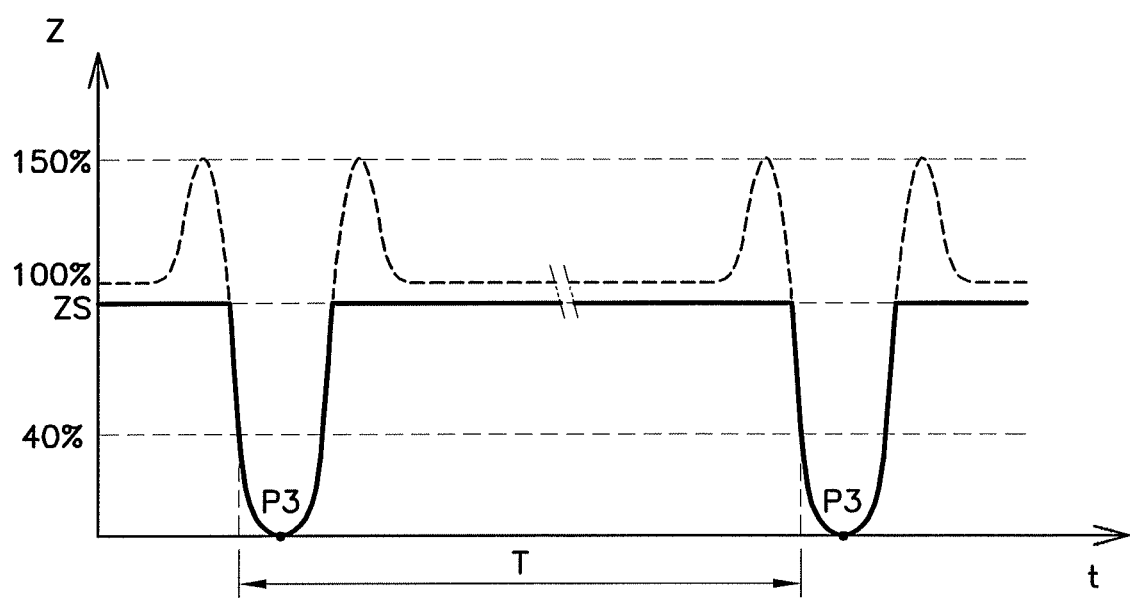
FIG. 5 is a view illustrating the tire footprint detection signal for a vehicle wheel equipped with a wheel unit positioned on the inner face of the tread of the tire, for a situation in which the radial acceleration sensor is saturated, the lost signal being illustrated by a dashed line.

This second step takes place at high speeds. Specifically, as already mentioned, beyond a radial acceleration threshold Zs, the acceleration sensor of the wheel unit 10 is saturated, such that it is not possible to obtain the radial acceleration values of the wheel through measurements taken directly by the radial acceleration sensor, or the values given by the latter are erroneous. This is reflected, in the tire footprint detection signal, in a loss of information beyond a threshold Zs; in other words, the tire footprint detection signal is truncated, as illustrated in FIG. 5.

This second step therefore consists in determining a value by calculating the radial acceleration Zcalc; to this end, it is necessary to:

a) determine the period of rotation T of the wheel 1 as described above for step 1b)

b) calculate said radial acceleration Zcalc using the following formula:

$$Zcalc = R \times \omega^2$$

where:

$$\omega = \frac{2\Pi}{T}$$

R being the distance between the axis X of rotation of the wheel and the wheel unit 10 defined and stored in step 1) of the method according to the invention and T being the period of rotation determined in step 2a).

It is obvious that if the wheel unit is attached to the inner face of the tread of the tire, the period of rotation T is determined in step 2a) outside of the truncated portion of the tire footprint detection signal.

The invention claimed is:

1. A method for determining a radial acceleration of a wheel of a motor vehicle in conditions in which a radial acceleration sensor is saturated, said vehicle being fitted with a system for monitoring the pressure of the tires of the wheels of the vehicle, and being equipped with an electronic central unit, and a microprocessor, said wheels each including a wheel unit attached to a rim or to a valve or to an inner face of the tread of the tire of the wheel, and including said at least one radial acceleration sensor at a distance from an axis of rotation of said wheel, configured to measure the radial acceleration of the wheel when it is not saturated, the method comprising:

1) a first step, when the radial acceleration sensor is not saturated, comprising:
   a) measuring the radial acceleration of the wheel using the radial acceleration sensor;
   b) determining a period of rotation of the wheel;
   c) deducting, from this radial acceleration and from this period, the distance from the wheel unit using the formula:

$$R = \frac{Z}{\omega^2}$$

where:

$$\omega = \frac{2\pi}{T}$$

d) storing this distance in a memory of the wheel unit;

2) a second step, when the radial acceleration sensor is saturated, comprising;
   a) determining the period of rotation of the wheel;
   b) calculating said radial acceleration using the following formula:

$$Zcalc = R \times \omega^2$$

where:

$$\omega = \frac{2\pi}{T}$$

R being the distance between the axis of rotation of the wheel and the wheel unit defined and stored in step 1) and T being the period of rotation determined in step 2a).

2. The method as claimed in claim 1, wherein the wheel unit is attached to the rim or the valve of the wheel of the vehicle, wherein the period of rotation (T) of the wheel is determined in steps 1b) and 2a) from a sinusoidal gravity signal.

3. The method as claimed in claim 2, wherein the period of rotation of the wheel corresponds to a time separating two consecutive maxima or two consecutive minima of the sinusoidal gravity signal.

4. The method as claimed in claim 3, wherein step 1) of determining the distance between the axis of rotation of the wheel and the wheel unit is triggered when the vehicle is set in motion.

5. The method as claimed in claim 3, wherein step 1) of determining the distance between the axis of rotation of the wheel and the wheel unit is repeated after each stoppage of the vehicle.

6. The method as claimed in claim 2, wherein step 1) of determining the distance between the axis of rotation of the wheel and the wheel unit is triggered when the vehicle is set in motion.

7. The method as claimed in claim 2, wherein step 1) of determining the distance between the axis of rotation of the wheel and the wheel unit is repeated after each stoppage of the vehicle.

8. The method as claimed in claim 1, wherein the wheel unit is attached to the inner face of the tread of the tire of the wheel of the vehicle, wherein the period of rotation of the wheel is determined in steps 1b) and 2a) from a footprint detection signal.

9. The method as claimed in claim 8, wherein the period of rotation of the wheel corresponds to a time separating two footprint detections.

10. The method as claimed in claim 9, wherein step 1) of determining the distance between the axis of rotation of the wheel and the wheel unit is triggered when the vehicle is set in motion.

11. The method as claimed in claim 9, wherein step 1) of determining the distance between the axis of rotation of the wheel and the wheel unit is repeated after each stoppage of the vehicle.

12. The method as claimed in claim 8, wherein step 1) of determining the distance between the axis of rotation of the wheel and the wheel unit is triggered when the vehicle is set in motion.

13. The method as claimed in claim 8, wherein step 1) of determining the distance between the axis of rotation of the wheel and the wheel unit is repeated after each stoppage of the vehicle.

14. The method as claimed in claim 1 wherein step 1) of determining the distance between the axis of rotation of the wheel and the wheel unit is triggered when the vehicle is set in motion.

15. The method as claimed in claim 14, wherein step 1) of determining the distance between the axis of rotation of the wheel and the wheel unit is repeated after each stoppage of the vehicle.

16. The method as claimed in claim 1 wherein step 1) of determining the distance between the axis of rotation of the wheel and the wheel unit is repeated after each stoppage of the vehicle.

17. The method as claimed in claim 16, wherein step 1) of determining the distance between the axis of rotation of the wheel and the wheel unit is repeated after each stoppage of the vehicle of a duration at least equal to 5 minutes.

\* \* \* \* \*

UNITED STATES PATENT AND TRADEMARK OFFICE
CERTIFICATE OF CORRECTION

PATENT NO. : 10,661,616 B2
APPLICATION NO. : 15/767231
DATED : May 26, 2020
INVENTOR(S) : Nicolas Guinart and Jean-Philippe Boisset It is certified that error appears in the above-identified patent and that said Letters Patent is hereby corrected as shown below:

In the Claims

In Claim 2, Column 8, Line 26, "...wherein the period of rotation (T) of the wheel is..." should be -- wherein the period of rotation of the wheel is... --.

Signed and Sealed this
Twenty-first Day of July, 2020

Andrei Iancu
*Director of the United States Patent and Trademark Office*